(12) United States Patent
Mino et al.

(10) Patent No.: US 6,437,998 B1
(45) Date of Patent: Aug. 20, 2002

(54) RECTIFYING CIRCUIT AND CONTROL METHOD THEREFOR

(75) Inventors: Kazuaki Mino; Kazuo Kuroki, both of Tokyo (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/983,027

(22) Filed: Oct. 22, 2001

(30) Foreign Application Priority Data

Oct. 31, 2000 (JP) .......................................... 2000-332544

(51) Int. Cl.[7] ........................ H02M 5/45; H02M 7/5387
(52) U.S. Cl. ............................. 363/37; 363/132; 363/98
(58) Field of Search ............................ 363/37, 97, 98,
363/131, 132, 21.02; 323/210, 222; 307/102;
315/209 R, 244

(56) References Cited

U.S. PATENT DOCUMENTS 4,670,828 A * 6/1987 Shekhawat et al. ............ 363/56
6,025,999 A * 2/2000 Farrington et al. ............ 363/16
6,278,626 B1 * 8/2001 Teicmann .................... 363/135

* cited by examiner

*Primary Examiner*—Rajinikant B. Patel
(74) *Attorney, Agent, or Firm*—Kanesaka & Takeuchi

(57) ABSTRACT

A series circuit of two switching devices and a series circuit of two diodes are connected together in parallel to constitute a bi-directional switch circuit for one phase. N bi-directional switch circuits are provided, and the junction between the switching devices of each of the switch circuits is connected to an AC input terminal of a corresponding phase via a reactor. A cathode of the diode series circuit of each switch circuit is connected to a positive output terminal via a diode, and an anode of the diode series circuit of each switch circuit is connected to a negative output terminal via a diode. Two capacitors are connected in series between the positive and negative output terminals, and the junction between the diodes of each switch circuit is connected to the junction between the two capacitors.

9 Claims, 14 Drawing Sheets

RECTIFYING CIRCUIT AND CONTROL METHOD THEREFOR

BACKGROUND OF THE INVENTION AND RELATED ART STATEMENT

The present invention relates to a rectifying circuit for converting an N-phase (N being a natural number equal to or greater than 2) AC voltage into a DC voltage, as well as a control method therefor.

FIG. 14 shows a conventional rectifying circuit for converting a three-phase AC voltage into a DC voltage. This conventional technique is substantially described in Japanese Patent Publication (KOKAI) No. 9-182441. In FIG. 14, R, S and T denote AC input terminals; P and N denote DC output terminals; L1, L2 and L3 denote reactors; D1 to D18 denote diodes; S1 to S3 denote switching devices of corresponding phases; and C1 and C2 denote capacitors.

Next, the operation of this circuit will be described. In the following, names of elements may be omitted, with only their reference numerals shown. For example, when the switching devices S1 and S2 are turned on, current flows through a path R→L1→D1→S1→D8→D9→S2→D4→L2→S→R to accumulate energy in the reactors L1 and L2. Furthermore, when S1 is turned off with S2 on, the energy from the reactors L1 and L2 is charged to the capacitor C1 through the path R→L1→D1→D13→C1→D9→S2→D4→L2→S→R. On the other hand, when S2 is turned off with S1 on, current flows through a path R→L1→D1→S1→D8→C2→D16→D4→L2→S→R to charge the energy from the reactors L1 and L2 to the capacitor C2.

Further, when both S1 and S2 are turned off, current flows through a path R→L1→D1→D13→C1→C2→D16→D4→L2→S→R to charge the energy from the reactors L1 and L2 to both capacitors C1 and C2. Repetition of such switching operations enables an AC voltage to be converted into a DC voltage while the input current is controlled at a high power factor. Further, the voltages of the two capacitors C1 and C2 can be individually regulated by adjusting the on-time of the switching devices S1 to S3.

In the conventional three-phase input technique shown in FIG. 14, the number of semiconductor devices (switching devices and diodes) through which current passes is six for storage of energy in the reactors, five for individual charging of the capacitor C1 or C2, and four for the simultaneous charging of both capacitors C1 and C2. Thus, current passes through a large number of devices, thus increasing energy loss in the semiconductor devices. Further, the cooling parts for reducing heat generated by the energy loss must be large, thereby increasing the size and price of the apparatus. Additionally, a main circuit includes a large number of semiconductor devices, specifically 21.

It is thus an object of the present invention to provide a rectifying circuit and control method therefor for reducing the number of semiconductor devices through which current passes as compared to the prior art, thereby reducing energy loss, and for reducing number of semiconductor device parts, making it possible to reduce the size, weight, and price of the apparatus.

Further objects and advantages of the invention will be apparent from the following description of the invention.

SUMMARY OF THE INVENTION

To attain the above object, the first aspect of the present invention is a rectifying circuit for converting an N-phase (N being a natural number equal to or greater than 2) AC voltage into a DC voltage. In the rectifying circuit, a series circuit of two switching devices having the same conductive direction and a series circuit of two diodes having the same conductive direction are connected together in parallel to constitute a bi-directional switch circuit for one phase. N bi-directional switch circuits are provided, and a junction between the switching devices of each bi-directional circuit is connected to an AC input terminal of a corresponding phase via a reactor. A cathode of the diode series circuit of each bi-directional switch circuit is connected to a positive DC output terminal via a diode, and an anode of the diode series circuits of each bi-directional switch circuit is connected to a negative DC output terminal via a diode. Two capacitors are connected in series between the positive and negative DC output terminals. The junction between the diodes of each bi-directional switch circuit is connected to a junction between the two capacitors.

In the second aspect of the present invention, two series circuits each comprising a diode and a switching device having different conductive directions are formed, and the first and second series circuits are connected together in parallel so that the cathodes of the diodes are connected together to constitute a bi-directional switch circuit for one phase. N bi-directional switch circuits are provided, and an internal junction of the first series circuit of each of the bi-directional switch circuits is connected to an AC input terminal of a corresponding phase via a reactor. The cathodes of the diodes of each bi-directional switch circuit are connected to a positive DC output terminal via a diode, and a junction between the switching devices of each bi-directional switch circuit is connected to a negative DC output terminal via a diode. Two capacitors are connected together in series between the positive and negative DC output terminals. All internal junctions of the second series circuits of the bi-directional switch circuits are connected to a junction between the two capacitors.

In the third aspect of the present invention, two series circuits each comprising a diode and a switching device having different conductive directions are formed, and the first and second series circuits are connected together in parallel so that the anodes of the diodes are connected together to constitute a bi-directional switch circuit for one phase. N bi-directional switch circuits are provided, and an internal junction of the first series circuit of each of the bi-directional switch circuits is connected to an AC input terminal of a corresponding phase via a reactor. A junction between the switching devices of each bi-directional switch circuit is connected to a positive DC output terminal via a diode, and the anodes of the diodes of each bi-directional switch circuit are connected to a negative DC output terminal via a diode. Two capacitors are connected together in series between the positive and negative DC output terminals via a diode. All internal junctions of the second series circuits of the bi-directional switch circuits are connected to a junction between the two capacitors.

In the fourth aspect of the present invention, a series circuit of two diodes having the same conductive direction and a series circuit of two switching devices having the same conductive direction are connected together in parallel to constitute a bi-directional switch circuit for one phase. N bi-directional switch circuits are provided, and a junction between the diodes of each bi-directional switch circuit is connected to an AC input terminal of corresponding phase via a reactor. A cathode of the diode series circuit of each bi-directional switch circuit is connected to a positive DC output terminal via a diode, and an anode of the diode series circuits of each bi-directional switch circuit is connected to a negative DC output terminal via a diode. Two capacitors are connected in series between the positive and negative DC output terminals, and a junction between the switching devices of each bi-directional switch circuit is connected to a junction between the two capacitors.

In the fifth aspect of the present invention, according to any of the second to fourth aspects, one of the two diodes constituting each bi-directional switch circuit is replaced with a thyrister and, when the interphase power is low, the thyrister is turned on to restrain a rush current to the capacitor when the power supply is turned on.

In the sixth aspect of the present invention, N+1 series circuits each comprising two switching devices are formed. The first to N+1-th switching-device series circuits are connected together in parallel, and a diode is connected inversely in parallel to each switching device. N series circuits each comprising two diodes are formed. The first to N-th diode series circuits are connected together in parallel so that the cathodes of the diodes are connected together, while the anodes thereof are connected together and the cathodes are connected to a positive DC output terminal. The anodes are connected to a negative DC output terminal. Two capacitors are connected in series between the positive and negative DC output terminals. A junction between the diodes of each of the first to N-th diode series circuits is connected to a junction between the switching devices of a corresponding one of the first to N-th switching-device series circuits, and the junction between the diodes of each of the first to N-th diode series circuit is connected to an AC input terminal of a corresponding phase via a reactor. A junction between the switching devices of the N+1-th switching-device series circuit is connected to a junction between the two capacitors.

In the seventh aspect of the present invention, N+1 series circuits each comprising two switching devices are formed. The first to N+1-th switching-device series circuits are connected together in parallel, and a diode is connected inversely in parallel to each switching device. The cathodes of the diodes of parallel-connection circuits of the first to N+1-th switching-device series circuits are connected to a positive DC output terminal via a diode, and the anodes of the diodes of the parallel-connection circuits of the first to N+1-th switching-device series circuits are connected to a negative DC output terminal via a diode. Two capacitors are connected in series between the positive and negative DC output terminals. A junction between the switching devices of each of the first to N-th switching-device series circuits is connected to an AC input terminal of a corresponding phase via a reactor. The junction between the switching devices of the N+1-th switching-device series circuit is connected to a junction between the two capacitors.

In the eighth aspect of the present invention, in the rectifying circuit according to any of the first to seventh aspects, detected voltage values for both capacitors connected between DC output terminals are fed back in response to each command value so that, on the basis of the deviation between the detected voltage values and the command value, the switching devices present in the corresponding charging paths of the two capacitors are independently controlled to individually control the voltages at the two capacitors.

DETAILED DESCRIPTION OF PREFERRED EMBODIMENTS

Figure 1:
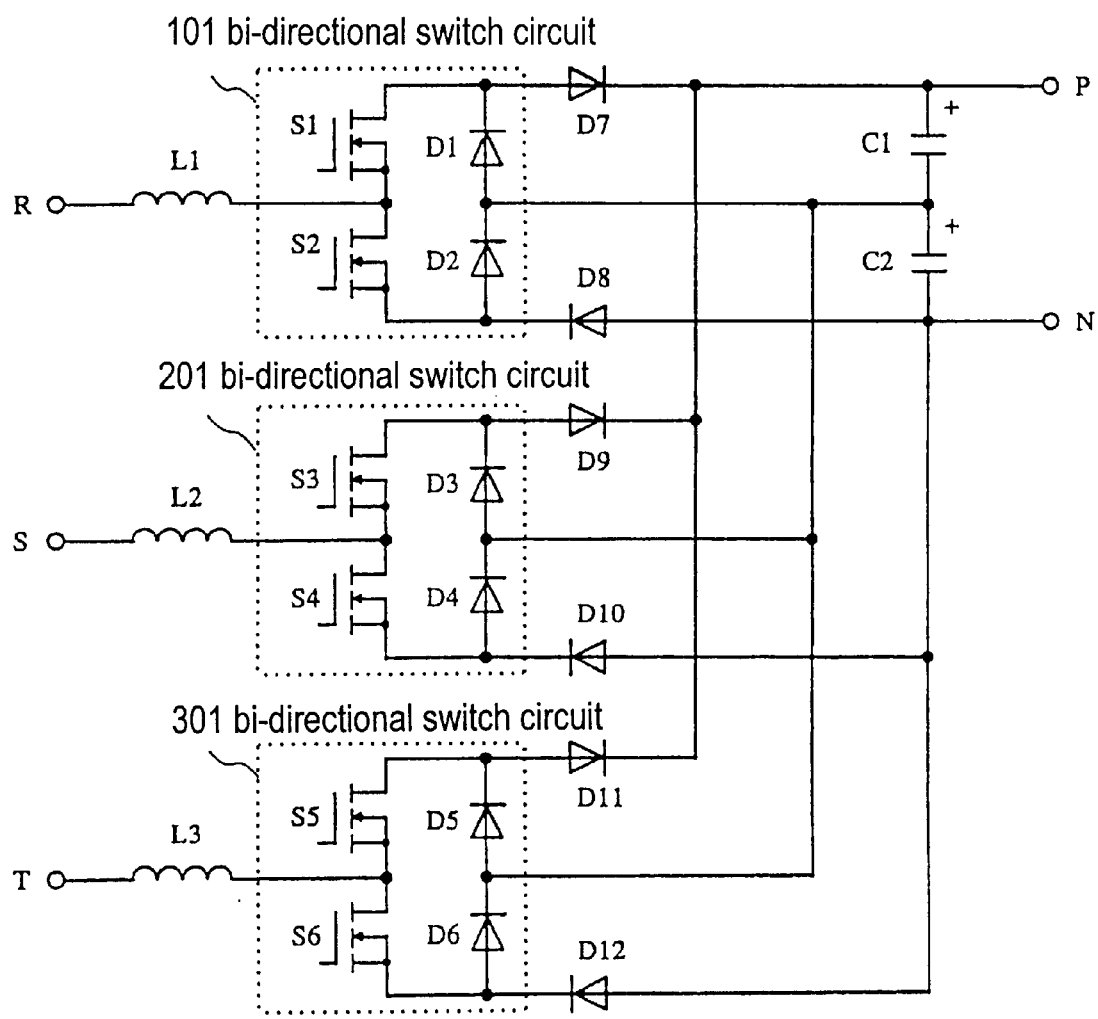
FIG. 1 is a circuit diagram showing a first embodiment of a rectifying circuit according to the present invention.

Embodiments of the present invention will be described below with reference to the drawings. First, FIG. 1 shows a first embodiment of a rectifying circuit according to the present invention, corresponding to the embodiment set forth in the first aspect. In FIG. 1, R, S and T denote AC input terminals, P and N denote DC output terminals; L1, L2 and L3 denote reactors; S1 to S6 denote switching devices composed of MOSFETS; D1 to D12 denote diodes; C1 and C2 denote capacitors connected together in series between the DC output terminals P and N; and 101, 201 and 301 denote bi-directional switch circuits.

The bi-directional switch circuits 101, 201 and 301 have the same configurations. For example, the switch circuit 101 comprises a series circuit of the switching devices S1 and S2, and a series circuit of the diodes D1 and D2, the series circuits being connected together in parallel. The junction between the switching devices S1 and S2 is connected to one end of the reactor L1, and the junction between the diodes D1 and D2 is connected to the junction between the capacitors C1 and C2. The opposite ends of the series circuit of the diodes D1 and D2 are connected to the corresponding ends of the series circuit of the capacitors C1 and C2 via the diodes D7 and D8.

In addition, in other bi-directional switch circuits 201 and 301, the opposite ends of the series circuit of the diodes D3 and D4, and the opposite ends of the series circuit of the diodes D5 and D6 are connected to the corresponding ends of the series circuit of capacitors C1 and C2 via the diodes D9 and D10, and diodes D11 and D12, respectively. Furthermore, the junction between the diodes D3 and D4 and the junction between the diodes D5 and D6 are connected to the junction between the capacitors C1 and C2.

Next, the operation of this circuit will be described. If, for example, the switching devices S2 and S3 are turned on, current flows through a path R→L1→S2→D2→D3→S3→L2→S→R to accumulate energy in the reactors L1 and L2. When S2 is turned off with S3 on, current flows through a path R→L1→parasitic diode of S1→D7→C1→D3→S3→L2→S→R to charge the capacitor C1. On the other hand, when S3 is turned off with S2 on, current flows through a path R→L1→S2→D2→C2→D10→parasitic diode of S4→L2→S→R to charge the capacitor C2. Moreover, when S2 and S3 are simultaneously turned off, current flows through a path R→L1→parasitic diode of S1→D7→C1→C2→D10→parasitic diode of S4→L2→S→R to simultaneously charge the capacitors C1 and C2.

Repeating such a switching operation enables the AC voltage to be converted into a DC voltage while controlling the input current at a high power factor. In this embodiment, the number of the semiconductor devices (switching devices and diodes) through which current passes is four for storage of energy in the reactors and four for charging the capacitors C1 or C2; less than that in the prior art. Therefore, energy loss in the semiconductor devices can be reduced to increase efficiency, while the size and weight of cooling parts are reduced as well. The total number of the semiconductor devices is also reduced to make it possible to reduce the size, weight and cost of the apparatus.

Figure 2:
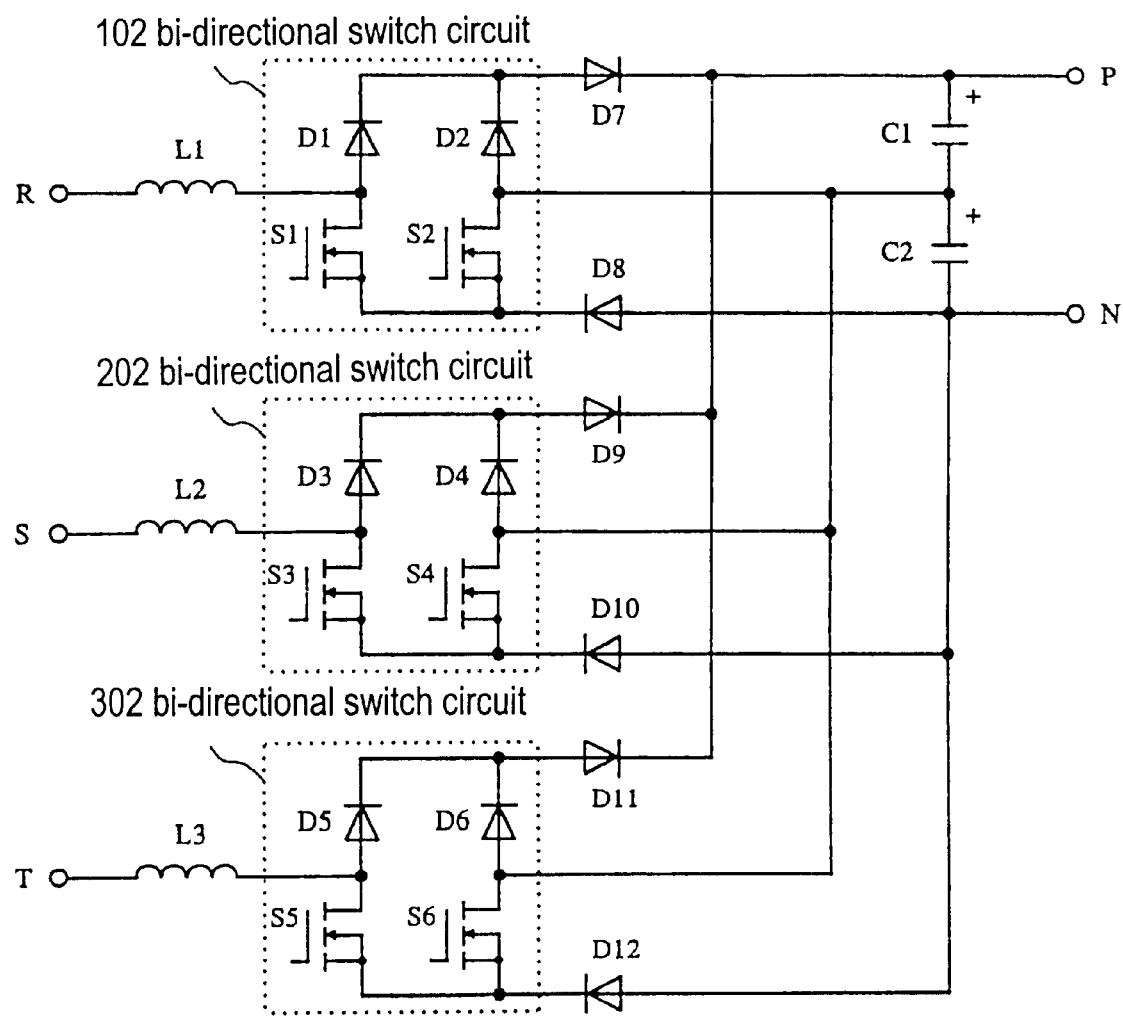
FIG. 2 is a circuit diagram showing a second embodiment of the rectifying circuit according to the present invention.

FIG. 2 shows a second embodiment of a rectifying circuit according to the present invention, corresponding to the embodiment set forth in the second aspect. With respect to bi-directional switch circuits 102, 202 and 302 of this embodiment, for example, the switch circuit 102 will be described. The switch circuit 102 comprises a series circuit of a diode D1 and a switching device S1, and a series circuit of a diode D2 and a switching device S2, the series circuits being connected together in parallel. The other switch circuits 202 and 302 have similar configurations. Further, the junction between the diode D1 and the switching device S1 is connected to one end of the reactor L1, and the junction between the diode D2 and the switching device S2 is connected to the junction between the capacitors C1 and C2. Furthermore, both cathodes of the diodes D1 and D2 are connected to an anode of the diode D7, and both drains of the switching devices S1 and S2 are connected to a cathode of the diode D8. The remaining parts of the configuration are similar to those of the first embodiment.

Next, the operation of this embodiment will be described. If, for example, the switching devices S1 and S4 are turned on, current flows through a path R→L1→S1→parasitic diode of S2→S4→parasitic diode of S3→L2→S→R to accumulate energy in the reactors L1 and L2. When S1 is turned off with S4 on, current flows through a path R→L1→D1→D7→C1→S4→parasitic diode of S3→L2→S→R to charge the capacitor C1. On the other hand, when S4 is turned off with S1 on, current flows through a path R→L1→S1→parasitic diode of S2→C2→D10→parasitic diode of S3→L2→S→R to charge the capacitor C2. Moreover, when S1 and S4 are simultaneously turned off, current flows through a path R→L1→D1→D7→C1→C2→D10→parasitic diode of S3→L2→S→R to simultaneously charge the capacitors C1 and C2.

Figure 3:
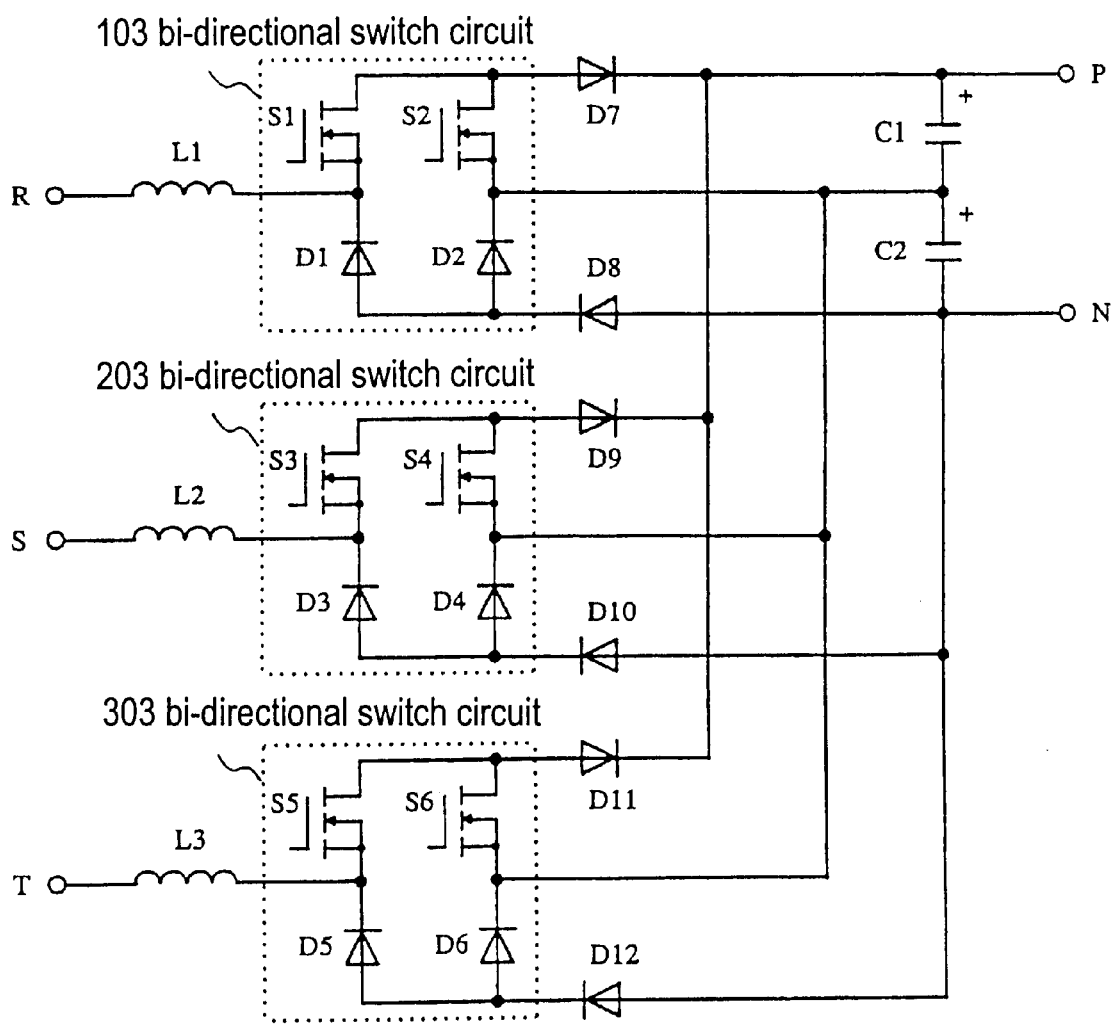
FIG. 3 is a circuit diagram showing a third embodiment of the rectifying circuit according to the present invention.

Also in this embodiment, repetition of the above switching operations enables the AC voltage to be converted into a DC voltage while controlling the input current at a high power factor. The number of the semiconductor devices through which current passes in order to accumulate energy in the reactor or charge the capacitors is also reduced to lessen energy losses in the semiconductor devices, thus making it possible to increase efficiency and reduce the size, weight and cost of cooling parts. FIG. 3 shows a third embodiment of the rectifying circuit according to the present invention, corresponding to the embodiment set forth in the third aspect. With respect to bi-directional switch circuits 103, 203 and 303 of this embodiment, for example, the switch circuit 103 will be described. The switch circuit 103 comprises a series circuit of a switching device S1 and a diode D1, and a series circuit of a switching device S2 and a diode D2, the series circuits being connected together in parallel, as in the embodiment shown in FIG. 2. In this embodiment, however, the switching devices S1 and S2 are connected to an upper arm, and the diodes D1 and D2 are connected to a lower arm. That is, both sources of the switching devices S1 and S2 are connected to an anode of a diode D7, and both anodes of the diodes D1 and D2 are connected to a cathode of a diode D8. The other switch circuits 203 and 303 have similar configurations.

Next, the operation of this embodiment will be described. If, for example, the switching devices S2 and S3 are turned on, current flows through a path R→L1→parasitic diode of S1→S2→parasitic diode of S4→S3→L2→S→R to accumulate energy in the reactors L1 and L2. When the switching device S2 is turned off with S3 on, current flows through a path R→L1→parasitic diode of S1→D7→C1→parasitic diode of S4→S3→L2→S→R to charge the capacitor C1. On the other hand, when S3 is turned off with S2 on, current flows through a path R→L1→parasitic diode of S1→S2→C2→D10→D3→L2→S→R to charge the capacitor C2. Moreover, when S2 and S3 are simultaneously turned off, current flows through a path R→L1→parasitic diode of S1→D7→C1→C2→D10→D3→L2→S→R to simultaneously charge the capacitors C1 and C2. This embodiment provides effects similar to those of the above embodiments.

Figure 4:
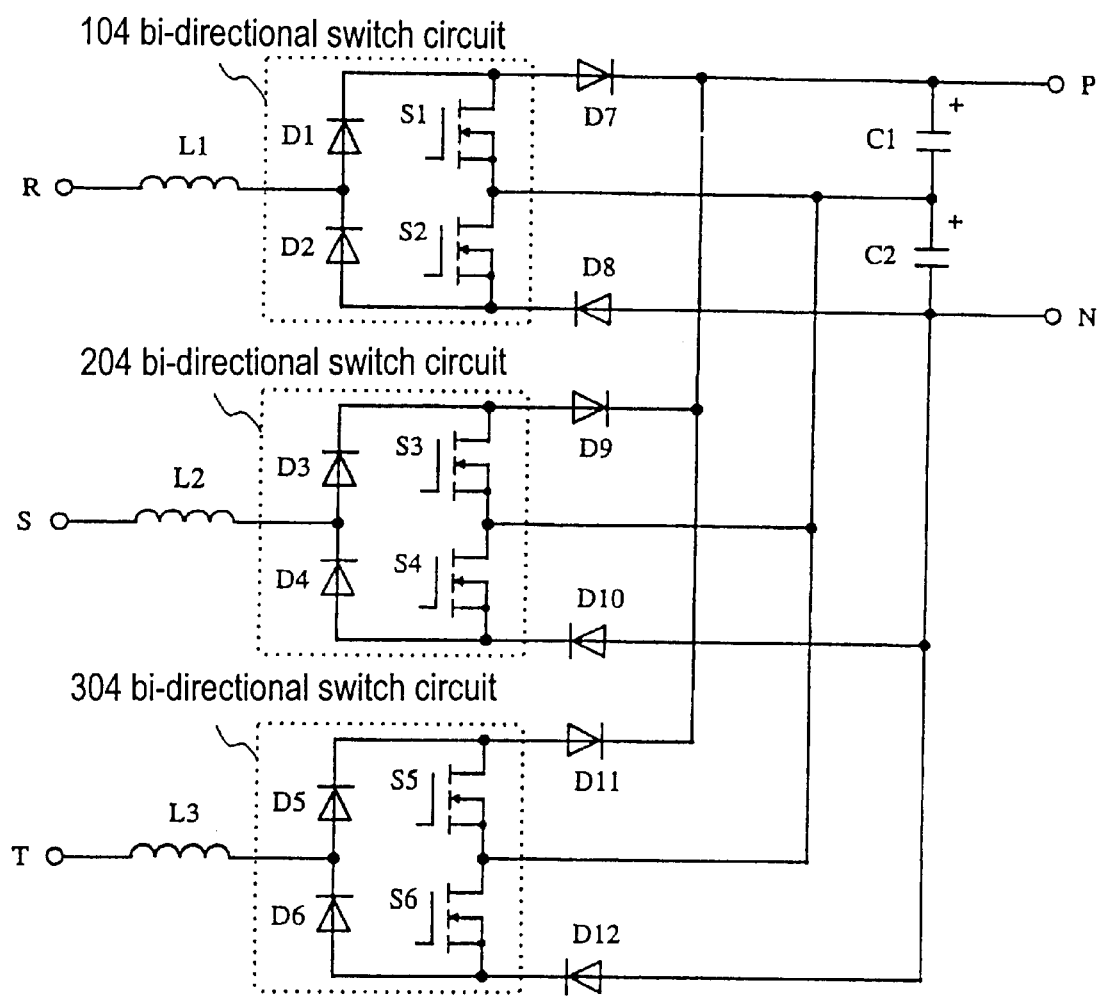
FIG. 4 is a circuit diagram showing a fourth embodiment of the rectifying circuit according to the present invention.

FIG. 4 shows a fourth embodiment of a rectifying circuit according to the present invention, corresponding to the embodiment set forth in the fourth aspect. With respect to bi-directional switch circuits 104, 204 and 304 of this embodiment, for example, a switch circuit 104 will be described. In the switch circuit 104, the series circuit of the switching devices S1 and S2 and the series circuit of the diodes D1 and D2 of the embodiment shown in FIG. 1 are replaced with each other, and the junction between the diodes D1 and D2 is connected to one end of the reactor L1, whereas the junction between the switching devices S1 and S2 is connected to the junction between the capacitors C1 and C2. This also applies to other switches 204 and 304.

Next, the operation of this embodiment will be described. If, for example, the switching devices S1 and S4 are turned on, current flows through a path R→L1→D1→S1→S4→D4→L2→S→R to accumulate energy in the reactors L1 and L2. When S1 is turned off with S4 on, current flows through a path R→L1→D1→D7→C1→S4→D4→L2→S→R to charge the capacitor C1. On the other hand, when S4 is turned off with S1 on, current flows through a path R→L1→D1→S1→C2→D10→D4→L2→S→R to charge the capacitor C2. Moreover, when S1 and S4 are simultaneously turned off, current flows through a path R→L1→D1→D7→C1→C2→D10→D4→L2→S→R to simultaneously charge the capacitors C1 and C2. This embodiment provides effects similar to those of each of the above embodiments.

Figure 5:
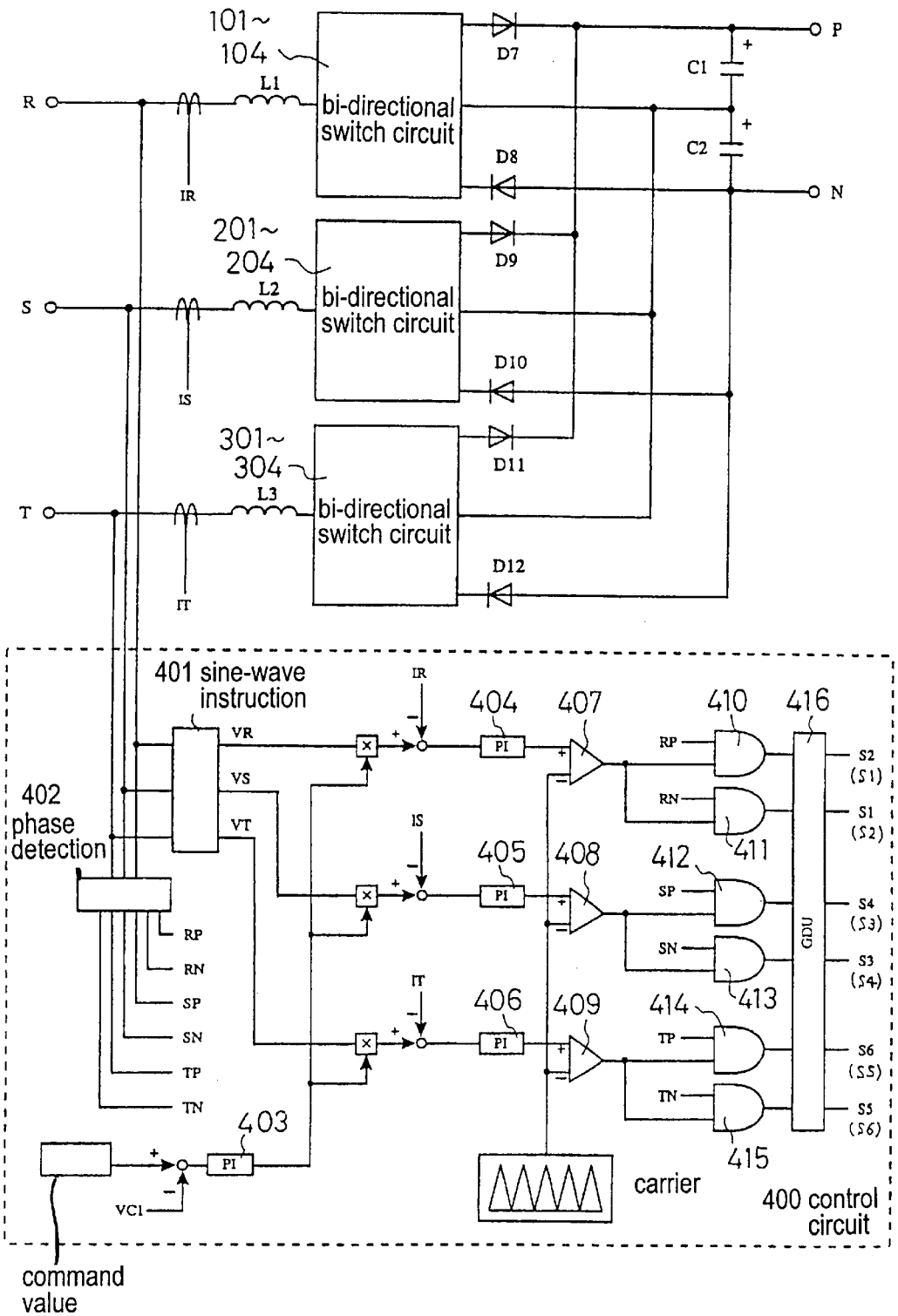
FIG. 5 is a view showing a configuration of a control circuit for controlling the rectifying circuit according to the present invention.

Next, FIG. 5 shows a control circuit applicable to the above-described rectifying circuits shown in FIGS. 1 to 4 and in FIGS. 6 to 8, which will be described later. In FIG. 5, reference numeral 400 denotes a control circuit, reference numeral 401 denotes sine-wave instructing means, reference numeral 402 denotes phase-detection means, reference numerals 403 to 406 denote PI regulation means, reference numerals 407 to 409 denote comparison means, reference numerals 410 to 415 denote AND operation means, and reference numeral 416 denotes gate-driving means.

Next, the operation of this control circuit will be described. The sine-wave instructing means 401 produces sine-wave instructions VR, VS and VT, the phases of which synchronize with the input voltages of corresponding phases, and the phase-detection means 402 produces signals RP, RN, SP, SN, TP and TN synchronized with the polarities of the input voltages. Further, a DC output voltage VC1 detected from a main circuit is minor-fed back to a command value and multiplied by the sine-wave instructions VR, VS and VT via the PI regulation means 403. The results of these multiplication operations and input currents IR, IS and IT of the corresponding phases detected from the main circuit are minor-fed back to the multiplication results and compared with a carrier signal by the comparison means 407 to 409 via the PI regulation means 404 to 406, to obtain PWM signals.

Furthermore, the operation means 410 to 415 perform AND operations on the signals RP, RN, SP, SN, TP and TN synchronized with the input voltages and the PWM signals to create control signals for the switching devices S1 to S6 via the gate-driving means 416. In this case, the control signal for the switching device S1 is created on the basis of the comparison between the negative synchronizing signal RN of an R phase and the PWM signal, and the control signal for the switching device S2 is created on the basis of a comparison between the positive synchronizing signal RP of the R phase and the PWM signal. Similarly, the control signal for the switching device S3 is created on the basis of a comparison between the negative synchronizing signal SN of an S phase and the PWM signal, and the control signal for the switching device S4 is created on the basis of a comparison between the positive synchronizing signal SP of the S phase and the PWM signal. Additionally, the control signal for the switching device S5 is created on the basis of a comparison between the negative synchronizing signal TN of a T phase and the PWM signal, and the control signal for the switching device S6 is created on the basis of a comparison between the positive synchronizing signal TP of the T phase and the PWM signal.

In this manner, the minor feedback control allows the input current to be controlled as a sine waveform synchronized with the input voltage, and, in turn, allows the output voltage to be controlled as a fixed DC voltage. Consequently, the AC voltage can be converted into a DC voltage while the input current is controlled at a high power factor.

The switching devices of the bi-directional switch circuits 101 to 104, 201 to 204, and 301 to 304 in the embodiments shown in FIGS. 1 to 4 may comprise IGBTs (insulated gate bipolar transistors) instead of the MOSFETs. In this case, the control circuit shown in FIG. 5 is applicable, but the outputs from the gate-driving means 416 corresponding to the switching devices of the different phases must be changed to those given in parentheses shown in FIG. 5. For example, for the S phase, the control signal for S1 is created on the basis of a comparison between the positive synchronizing signal RP of the R phase and the PWM signal, and the control signal for S2 is created on the basis of a comparison between the negative synchronizing signal RP of the R phase and the PWM signal.

Figure 6:
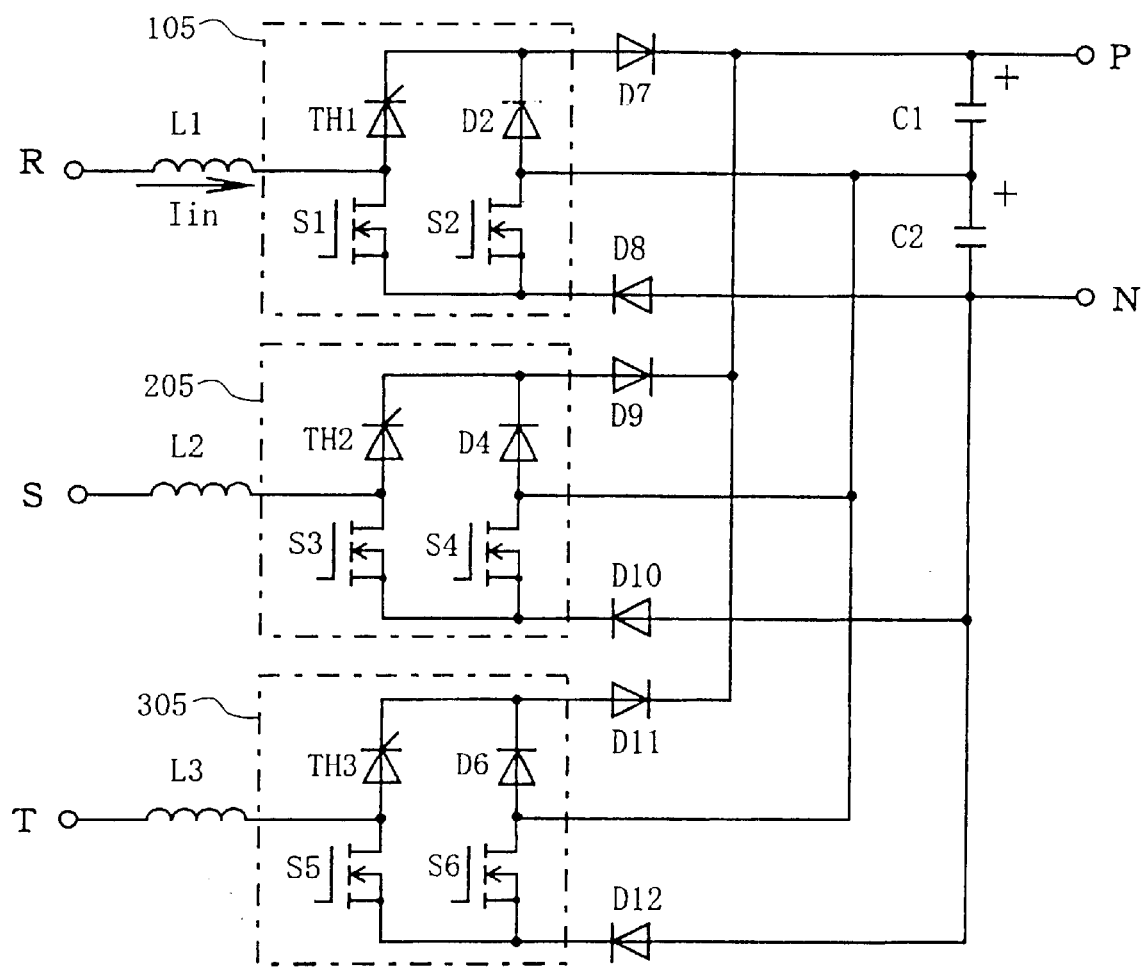
FIG. 6 is a circuit diagram showing a fifth embodiment of the rectifying circuit according to the present invention.

FIG. 6 shows a fifth embodiment of the rectifying circuit according to the present invention. In this figure, bi-directional switch circuits 105, 205 and 305 comprise thyristers TH1, TH2 and TH3 instead of the diodes D1, D3 and D5 in the embodiment shown in FIG. 2. The remaining parts of the configuration are the same as in FIG. 2.

Figure 9A:
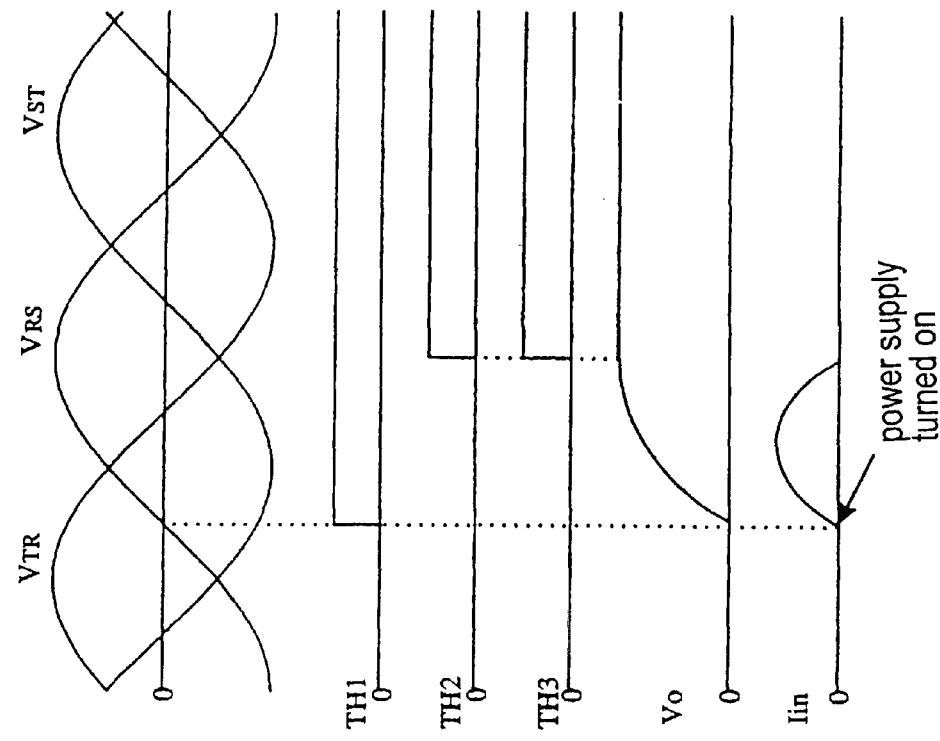
FIGS. 9(a) and 9(b) are explanatory diagrams of the operations of the fifth to seventh embodiments of the rectifying circuits according to the present invention.

For example, in the embodiment shown in FIG. 2, if the voltages at the opposite ends (DC output terminals P and N) of the series circuit of the capacitors C1 and C2 are not equal to or greater than the input-line voltage before the power supply is turned on, when the power supply is turned on, current flows through a path R→L1→D1→D7→C1→C2→D10→parasitic diode of S3 with the timing shown in FIG. 9(a), to charge the capacitors C1 and C2. This may cause an excessive rush current I to flow as shown in FIG. 9(a), thereby damaging the apparatus.

Figure 9B:
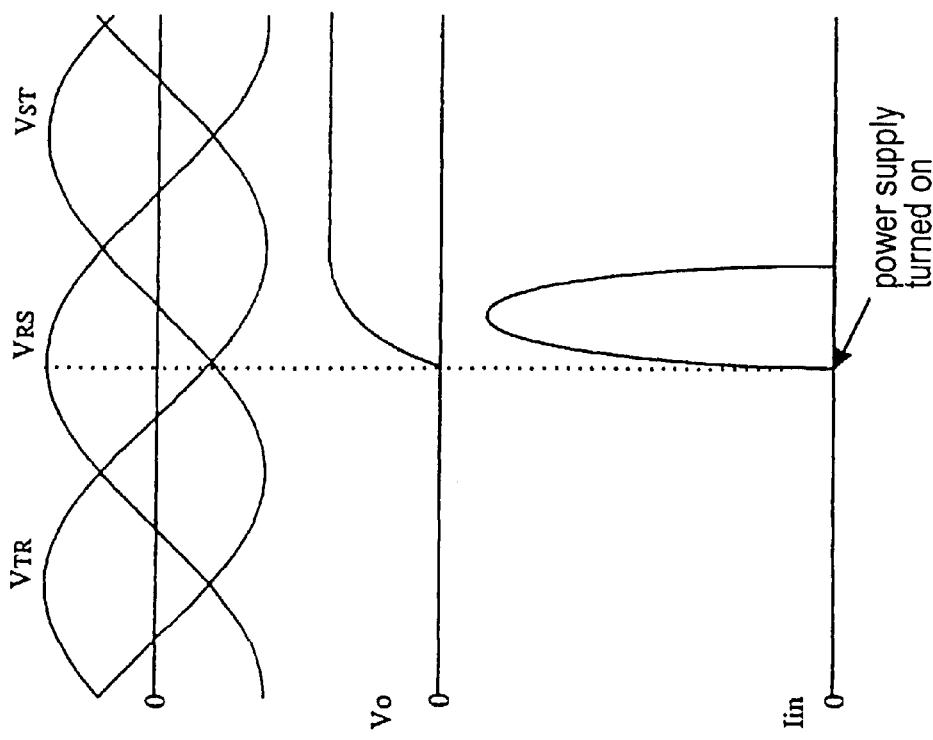

Thus, in the fifth embodiment, the diodes D1, D3 and D5 shown in FIG. 2 are replaced with the thyristers TH1, TH2 and TH3, and the thyrister TH1 is turned on when the input-line voltage VRS is zero or close to zero as shown in FIG. 9(b). The other thyristers TH2 and TH3 are turned on when the input-line voltages VST and VTR are zero or close to zero. If, for example, the thyrister TH1 is turned on when the VRS is close to zero, the capacitors C1 and C2 can be gradually charged to restrain an excessive rush current. Furthermore, if the thyristers TH2 and TH3 are turned on after the voltages at the capacitors have been saturated, the process can be changed to an operation similar to that in the embodiment shown in FIG. 2.

Figure 7:
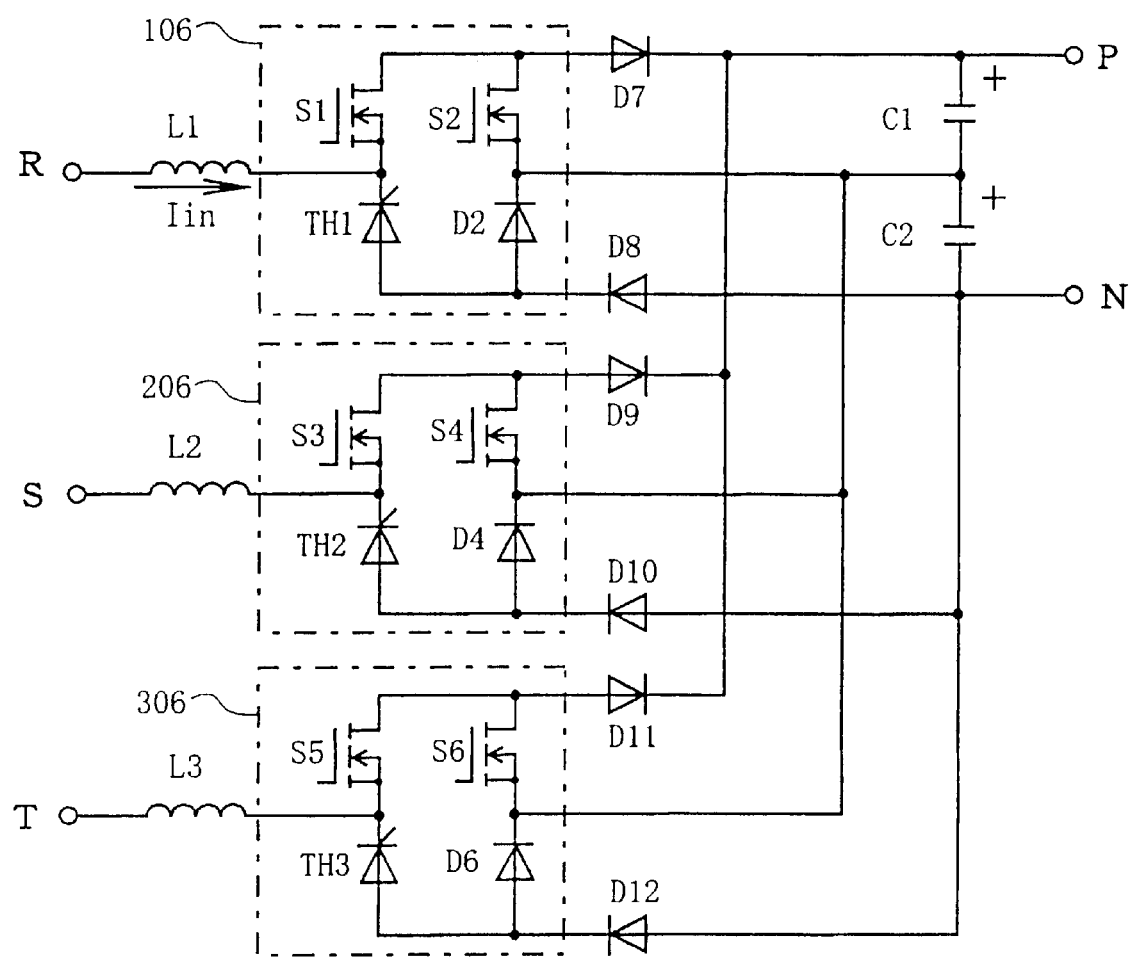
FIG. 7 is a circuit diagram showing a sixth embodiment of the rectifying circuit according to the present invention.
Figure 8:
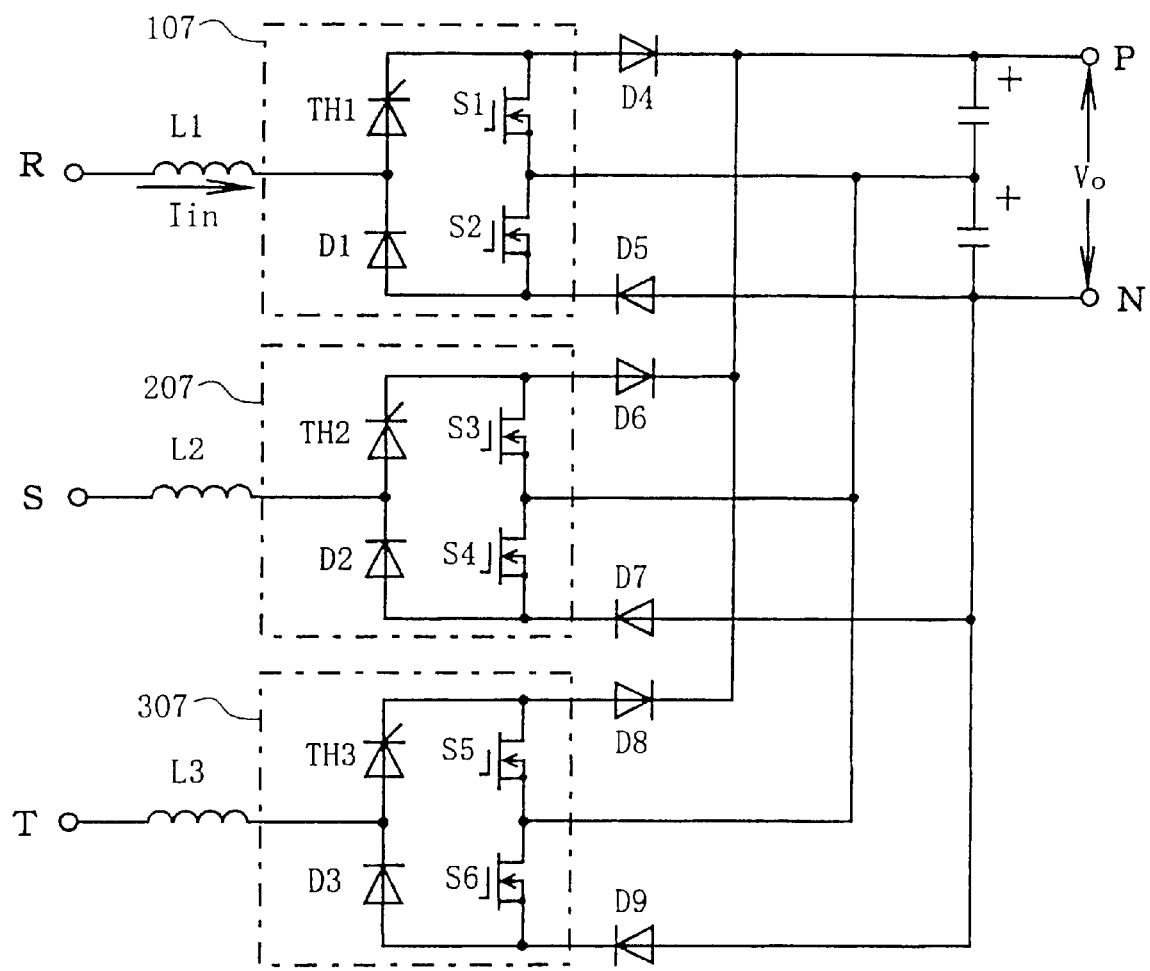
FIG. 8 is a circuit diagram showing a seventh embodiment of the rectifying circuit according to the present invention.

FIG. 7 shows a sixth embodiment of the rectifying circuit according to the present invention, and FIG. 8 shows a seventh embodiment. In these embodiments, the diodes D1, D3 and D5 of the embodiment shown in FIGS. 3 and 4 are replaced with the thyristers TH1, TH2 and TH3. In FIGS. 7 and 8, reference numerals 106, 107, 206, 207, 306 and 307 denote bi-directional switch circuits. Also in the sixth and seventh embodiments, a rush current can be prevented from flowing into the capacitors by means of the phase of the power-supply potential. The embodiments shown in FIGS. 6 to 8 correspond to that of the present invention set forth in the fifth aspect.

Figure 10:
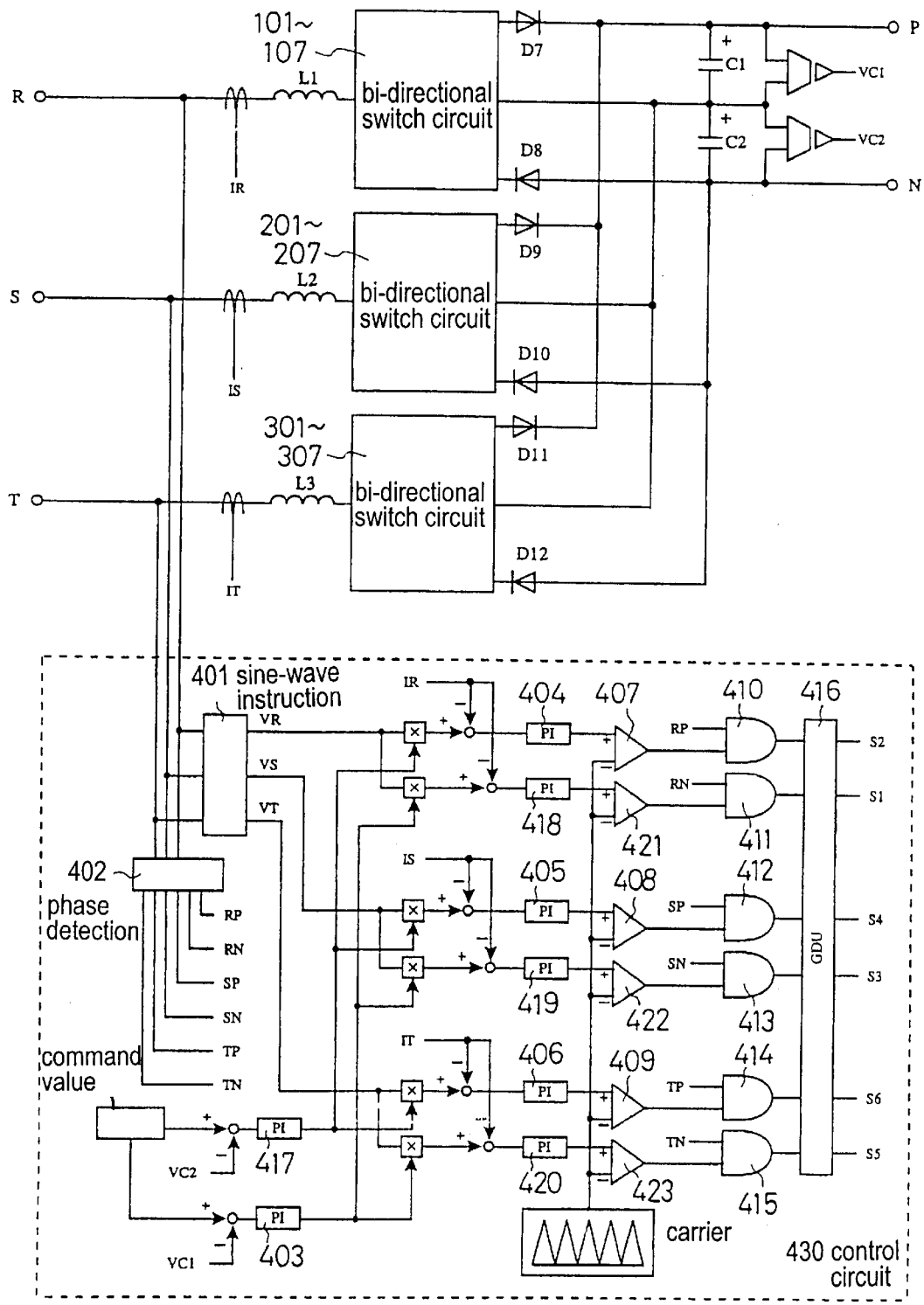
FIG. 10 is a circuit diagram showing a first embodiment of a control method according to the present invention.

FIG. 10 shows an embodiment of a control method according to the present invention, corresponding to an embodiment set forth in the eighth aspect. This control circuit is applicable to control the rectifying circuits shown in FIGS. 1 to 4 and 6 to 8. For example, for the rectifying circuit shown in FIG. 1, this control circuit individually controls the voltages at the capacitors C1 and C2 by varying on/off pulse widths for the upper switching devices S1, S3 and S5 of the bi-directional switch circuits 101, 201 and 301 so as to control the voltage at the capacitor C1, while varying on/off pulse widths for the lower switching devices S2, S4 and S6 so as to control the voltage at the capacitor C2. This serves to balance the capacitor voltages in order to prevent an intolerable voltage from being applied to the capacitors or semiconductor devices.

In FIG. 10, reference numeral 430 denotes a control circuit, reference numeral 401 denotes sine-wave instructing means, reference numeral 402 denotes phase-detection means, reference numerals 403 to 406 and 417 to 420 denote PI regulation means, reference numerals 407 to 409 and 421 to 423 denote comparison means, reference numerals 410 to 415 denote AND operation means, and reference numeral 416 denotes gate-driving means.

Next, the operation of this control circuit will be described. The sine-wave instructing means 401 produces sine-wave instructions VR, VS and VT, the phases of which synchronize with input voltages of the corresponding phases, and the phase-detection means 402 produces the signals RP, RN, SP, SN, TP and TN synchronized with the polarities of the input voltages. Further, the DC output voltage VC1 detected from the main circuit is minor-fed back to the command value and multiplied by the sine-wave instructions VR, VS and VT via the PI regulation means 417. Furthermore, the DC output voltage VC2 detected from the main circuit is minor-fed back to the command value and multiplied by the sine-wave instructions VR, VS and VT via the PI regulation means 403.

The results of these multiplication operations and the input currents IR, IS and IT of the corresponding phases detected from the main circuit are minor-fed back to the multiplication results and compared with the carrier signal by the comparison means 407 to 409 via the PI regulation means 404 to 406, to obtain PWM signals for the switching devices S2, S4 and S6. The input currents IR, IS and IT are also compared with the carrier signal by the comparison means 421 to 423 via the PI regulation means 418 to 420, to obtain PWM signals for the switching devices S1, S3 and S5. Furthermore, the operation means 410 to 415 perform AND operations on the signals RP, RN, SP, SN, TP and TN synchronized with the input voltages and the PWM signals to create control signals for the switching devices S1 to S6 via the gate-driving means 416. For example, the control circuit 430 operates so that the pulse width for the switching device S3 increases when the voltage at the capacitor C1 decreases, and decreases when the voltage at the capacitor C1 increases. Thus, the charging current for the capacitor C1 flowing through a path R→L1→parasitic diode of S1→D7→C1→D3→S3→L2→S→R varies to maintain the voltage at the capacitor C1 at a fixed value. Further, the control circuit 430 operates so that the pulse width for the switching device S2 increases when the voltage at the capacitor C2 decreases, and decreases when the voltage at the capacitor C2 increases. Thus, a charging current for the capacitor C2 flowing through a path R→L1→S2→D2→C2→D10→parasitic diode of S4→L2→S→R varies to maintain the voltage at the capacitor C2 at a fixed value. Such operations enable the voltages at the capacitors C1 and C2 to be individually controlled.

Also in this embodiment, the minor feedback control allows the input current to be controlled as a sine waveform synchronized with the input voltage, and in turn, allows the output voltage to be controlled as a fixed DC voltage. Consequently, the AC voltage can be converted to a DC voltage while the input current is controlled at a high power factor.

Figure 11:
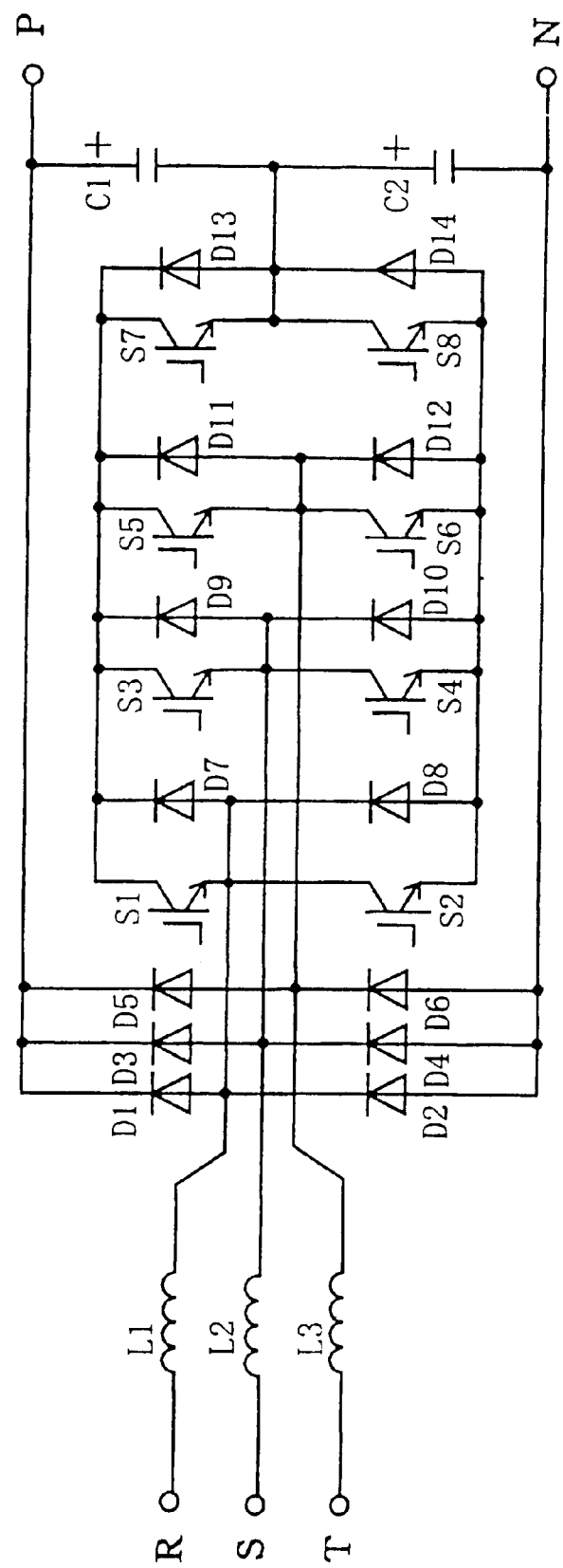
FIG. 11 is a circuit diagram showing an eighth embodiment of the rectifying circuit according to the present invention.

FIG. 11 shows an eighth embodiment of the rectifying circuit according to the present invention, corresponding to the embodiment set forth in the sixth aspect. Although an embodiment shown in FIGS. 11 to 13, which will be described later, shows an example in which IGBTs are used as the switching devices, MOSFETs can be used in these places. In FIG. 11, a series circuit of diodes D1 and D2, a series circuit of diodes D3 and D4, a series circuit of diodes D5 and D6, and a series circuit of capacitors C1 and C2 are connected together in parallel. Further, a series circuit of switching devices S1 and S2, a series circuit of switching devices S3 and S4, a series circuit of switching devices S5 and S6, and a series circuit of switching devices S7 and S8 are connected together in parallel. Diodes D7 to D14 are connected to the switching devices S1 to S8 inversely in parallel.

The junction between the diodes D1 and D2 is connected to one end of the reactor L1 and to the junction between the switching devices S1 and S2, the junction between the diodes D3 and D4 is connected to one end of the reactor L2 and to the junction between the switching devices S3 and S4, and the junction between the diodes D5 and D6 is connected to one end of the reactor L3 and to the junction between the switching devices S5 and S6. Further, the junction between the switching devices S7 and S8 is connected to the junction between the capacitors C1 and C2.

Next, the operation of this embodiment will be described. If, for example, the switching device S1 is turned on, current flows through a path R→L1→S2→D10, D12→L2, L3→S, T→R to accumulate energy in the reactors L1, L2 and L3. Then, when the switching device S2 is turned off, current flows through a path R→L1→D1→C1→C2→D4, D6→L2, L3→S, T→R to charge the capacitors C1 and C2. At this time, if the switching device S7 is on, current flows through a path R→L1→D7→S7→C2→D4, D6→L2, L3→S, T→R to charge the capacitor C2. On the other hand, if the switching device S8 is on, current flows through a path R→L1→D1→C1→S8→D10, D12→L2, L3→S, T→R to charge the capacitor C1.

Repeating such a switching operation enables the AC voltage to be converted into a DC voltage while the input current is controlled at a high power factor. Further, when the on/off pulse widths for the switching devices S7 and S8 are adjusted, the voltages at the capacitors C1 and C2 can be individually controlled so as to be balanced, thereby preventing the voltages at the semiconductor devices or capacitors from exceeding their tolerable voltages. Moreover, the number of semiconductor devices (switching devices and diodes) through which current passes is two for the storage of energy in the reactors, two for the simultaneous charging of the capacitors C1 and C2, and three for the charging of one of the capacitors. Consequently, as compared to the prior art, energy losses can be reduced to increase efficiency, while reducing the size, weight and costs of cooling parts.

Figure 12:
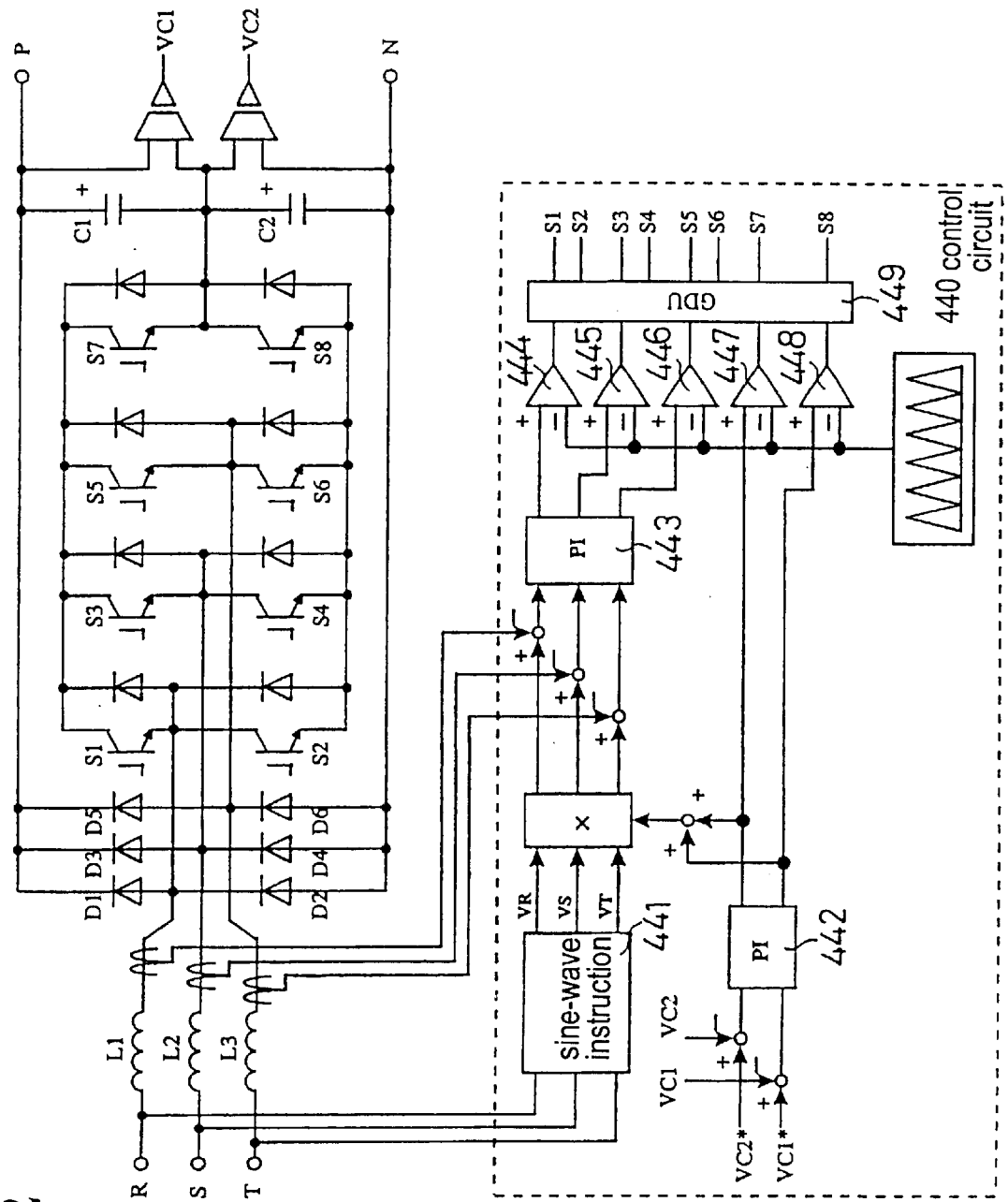
FIG. 12 is a circuit diagram showing a second embodiment of the control method according to the present invention.

FIG. 12 is a circuit diagram showing an embodiment of the control method according to the present invention, corresponding to the embodiment set forth in the eighth aspect. This control circuit is applicable to the rectifying circuits shown in FIGS. 11 and 13, which will be described later. In FIG. 12, reference numeral 440 denotes a control circuit, reference numeral 441 denotes sine-wave instructing means, reference numerals 442 and 443 denote PI regulation means, reference numerals 444 to 448 denote comparison means, and reference numeral 449 denotes gate-driving means.

Next, the operation of this control circuit will be described. The voltages VC1 and VC2 at the capacitors C1 and C2 detected from the main circuit are minor-fed back to the command values, deviations obtained are added via the PI regulation means 442, and the result of the addition is multiplied by the sine-wave instructions VR, VS and VT to modulate the amplitudes of the sine-wave instructions. Further, an output signal from the PI regulation means 442 is compared with the carrier signal by the comparison means 447 and 448 to obtain PWM signals, from which control signals for the switching devices S7 and S8 are created via the gate-driving means 449.

Figure 13:
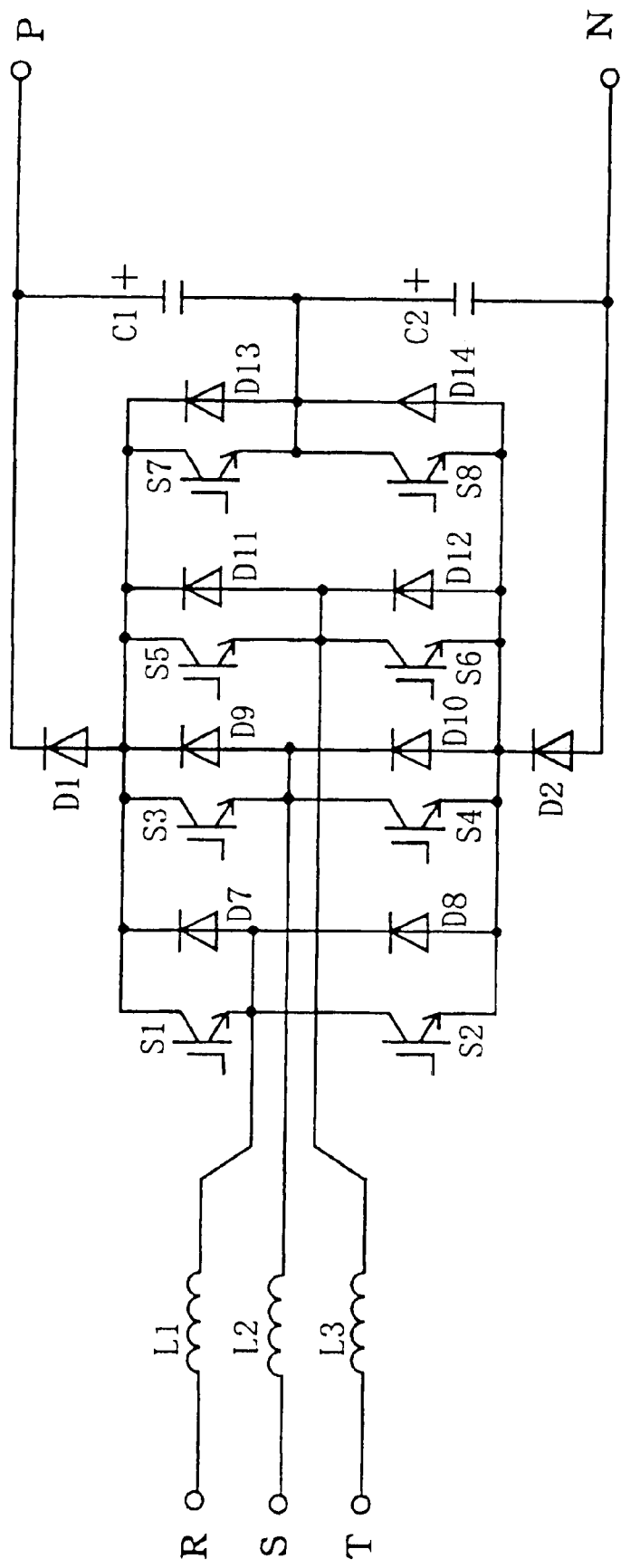
FIG. 13 is a circuit diagram showing a ninth embodiment of the rectifying circuit according to the present invention.
Figure 14:
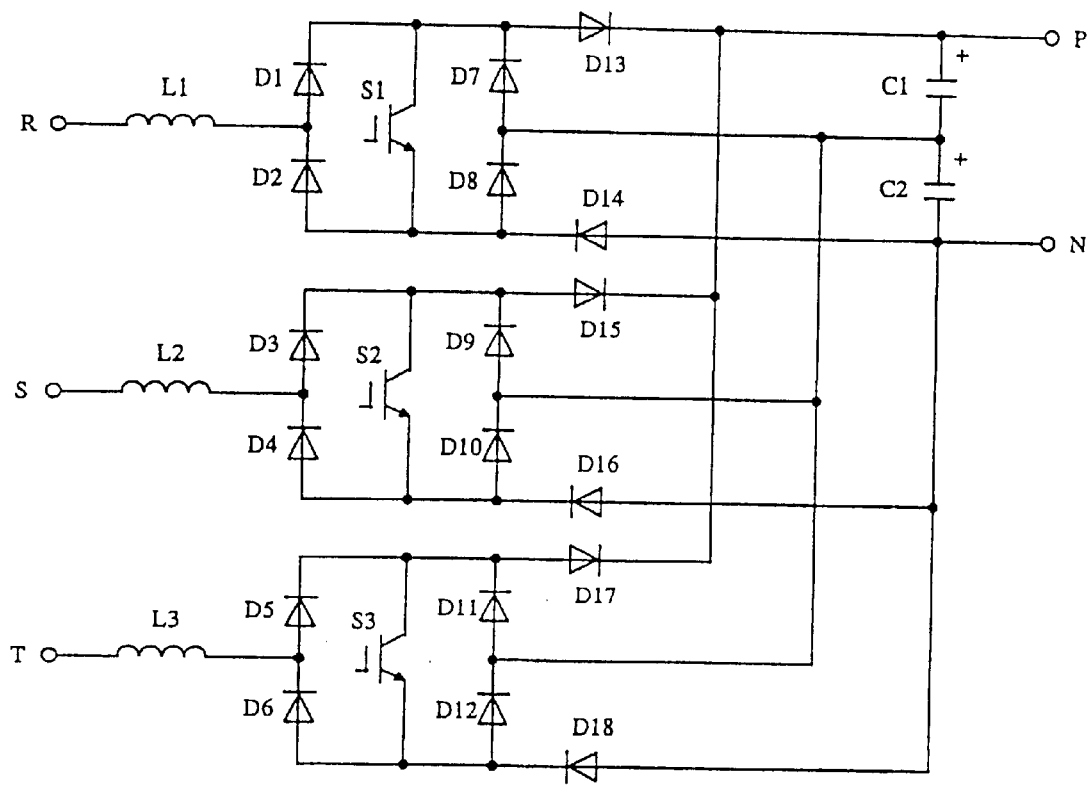
FIG. 14 is a circuit diagram showing a conventional technique.

Furthermore, the input currents of the corresponding phases detected from the main circuit are minor-fed back to the sine-wave instructions with the amplitude thereof modulated, and the deviations obtained are input to the PI regulation means 443 and then compared with the carrier signal by the comparison means 444 to 446 to obtain PWM signals, from which control signals for the switching devices S1 to S6 are created via the gate-driving means 449. In this manner, the minor feedback control allows the input current to be controlled as a sine waveform synchronized with the input voltage. The minor feedback control also enables the output voltage between the terminals P and N to be controlled as a fixed DC value, and the voltages at the capacitors C1 and C2 can be individually controlled. For example, the voltage at the capacitor C1 can be set at a predetermined value by controlling the on/off pulse width for the switching device S8 to control the charging current therefor, and the voltage at the capacitor C2 can be set at a predetermined value by controlling the on/off pulse width for the switching device S7 to control the charging current therefor. FIG. 13 shows a ninth embodiment of the rectifying circuit according to the present invention, corresponding to the embodiment set forth in the seventh aspect. The configuration of this embodiment will be described in comparison with FIG. 11. That is, the diodes D1 to D6 shown in FIG. 11 are removed, and a circuit connected parallel comprising a series circuit of switching devices S1 and S2, a series circuit of switching devices S3 and S4, a series circuit of switching devices S5 and S6, and a series circuit of switching devices S7 and S8 is connected to DC output terminals P and N via diodes D1 and D2, respectively.

Next, the operation of this embodiment will be described. If, for example, the switching device S2 is turned on, current flows through a path R→L1→S2→D10, D12→L2, L3→S, T→R to accumulate energy in the reactors L1, L2, and L3. Then, when the switching device S2 is turned off, current flows through a path R→L1→D7→D1→C1→C2→D2→D10, D12→L2, L3→S, T→R to charge the capacitors C1 and C2. At this time, if the switching device S7 is on, current flows through a path R→L1→D7→S7→C2→D2→D4, D6→L2, L3→S, T→R to charge the capacitor C2. On the other hand, if the switching device S8 is on, current flows through a path R→L1→D7→D1→C1→S8→D10, D12→L2, L3→S, T→R to charge the capacitor C1.

Repetition of such a switching operation enables the AC voltage to be converted into a DC voltage while the input current is controlled at a high power factor. Further, when the on/off pulse widths for the switching devices S7 and S8 are adjusted, the voltages at the capacitors C1 and C2 can be individually controlled so as to be balanced, thereby preventing the voltages at the semiconductor devices or capacitors from exceeding their tolerable voltages. In this embodiment, the number of semiconductor devices (switching devices and diodes) through which current passes increases as compared to that in FIG. 11, but the number of diodes within the entire circuit can be reduced by four, thus reducing the number of parts required and the size and weight of the circuit.

In the above embodiments, the 3-phase AC voltage is converted into DC voltage, but the present invention is generally applicable to the rectifying circuit that converts an N-phase (N denotes a natural number equal to or greater than 2) AC voltage into a DC voltage.

As described above, according to the rectifying circuit of the present invention, the number of the semiconductors through which current passes in order to accumulate energy in the reactors or charge the capacitors can be reduced as compared to that of the prior art. Therefore, energy loss and the number of the parts of the semiconductor device can be reduced to reduce the size, weight and price of the entire apparatus, including the cooling device. Moreover, according to the control method of the present invention, the voltages at the output capacitors can be individually controlled to protect the semiconductor devices or capacitors from overvoltage.

While the invention has been explained with reference to the specific embodiments of the invention, the explanation is illustrative and the invention is limited only by the appended claims.

What is claimed is:

1. A rectifying circuit for converting an AC voltage with a plurality of phases into a DC voltage, comprising:
    a plurality of bi-directional switch circuits, one switch circuit for one phase including first and second series circuits formed of two switching devices and two diodes and connected together in parallel,
    a plurality of reactors, each being connected to a junction between the first series circuit of each bi-directional circuit and to an AC input terminal of each phase,
    a plurality of first diodes, each being connected to a junction between the first and second series circuit of each bi-directional switch circuit and to a positive DC output terminal,
    a plurality of second diodes, each being connected to a junction between the first and second series circuit of each bi-directional switch circuit and to a negative DC output terminal, and
    two capacitors connected in series between the positive and negative DC output terminals, all of the internal junctions of the second series circuits of the bi-directional switch circuits being connected to a junction between the two capacitors.

2. A rectifying circuit according to claim 1, wherein said first series circuit is formed of two switching devices having same conductive directions, and said second series circuit is formed of two diodes having same conductive directions, said first diode being connected to a cathode of the second series circuit and said second diode being connected to an anode of the second series circuit.

3. A rectifying circuit according to claim 1, wherein each of said first and second series circuits is formed of one diode and one switching device with different conductive directions, cathodes of the diodes of each bi-directional switch circuit being connected to the positive DC output terminal via the first diode, and a junction between the switching devices of each bi-directional switch circuit being connected to the negative DC output terminal via the second diode.

4. A rectifying circuit according to claim 1, wherein each of the first and second series circuits is formed of one diode and one switching device having different conductive directions, a junction between the switching devices of each bi-directional switch circuit being connected to the positive DC output terminal via the first diode and anodes of the diodes of each bi-directional switch circuit being connected to the negative DC output terminal via the second diode.

5. A rectifying circuit according to claim 1, wherein said first series circuit is formed of two diodes having same conductive directions and said second series circuit is formed of two switching devices having same conductive directions, a cathode of the diode of the first series circuit being connected to the positive DC output terminal via the first diode and an anode of the diode of the first series circuit being connected to the negative DC output terminal via the second diode.

6. A rectifying circuit according to claim 3, wherein one of the two diodes constituting each bi-directional switch circuit is a thyrister, and when an interphase power is low, the thyrister is turned on to restrain a rush current to the capacitor when a power supply is turned on.

7. A rectifying circuit for converting an N-phase AC voltage into a DC voltage, N being a natural number of at least 2, said rectifying circuit comprising:

N+1 switch series circuits connected in parallel, each being formed of two switching devices and two first diodes connected inversely in parallel to the switching devices, N diode series circuits each comprising two second diodes connected in series, cathodes of the second diodes of the N diode series circuits being connected together and to a positive DC output terminal, and anodes of the second diodes of the N diode series circuits being connected together and to a negative DC output terminal, a junction between the second diodes of each of the diode series circuits being connected to a junction between the switching devices of a corresponding one of the first to N-th switching-device series circuits, two capacitors connected in series between the positive and negative DC output terminals, a junction between the two capacitors being connected to a junction between the switching devices of the N+1-th switch series circuit, and N reactors, each being connected to an AC input terminal of a corresponding phase and to the junction between the second diodes.

8. A rectifying circuit for converting an N-phase AC voltage into a DC voltage, N being a natural number of at least 2, said rectifying circuit comprising:

N+1 switch series circuits connected in parallel, each being formed of two switching devices and two first diode connected inversely in parallel, a second diode connected to cathodes of the first diodes of the first to N+1-th switch series circuits and to a positive DC output terminal, a third diode connected to anodes of the first diodes of the first to N+1-th switch series circuits and to a negative DC output terminal, two capacitors connected in series between the positive and negative DC output terminals, a junction between the two capacitors being connected to a junction between the switching devices of the N+1-th switch series circuit, and N reactors, each being connected to a junction between the switching devices of each of the first to N-th switch series circuits and to an AC input terminal of a corresponding phase.

9. A rectifying circuit according to claim 1, wherein detected voltage values for the two capacitors connected between the DC output terminals are fed back in response to each command value so that, on a basis of a deviation between the detected voltage values and a command value, the switching devices present in corresponding charging paths of the two capacitors are independently controlled to individually control voltages at the two capacitors.

* * * * *